Dec. 20, 1949 A. J. HIRST 2,491,734
RESILIENT COUPLING FOR SHAFTS
Filed July 15, 1948 2 Sheets-Sheet 1

INVENTOR.
Archie John Hirst.
BY
Harness, Dickey & Pierce.
ATTORNEYS.

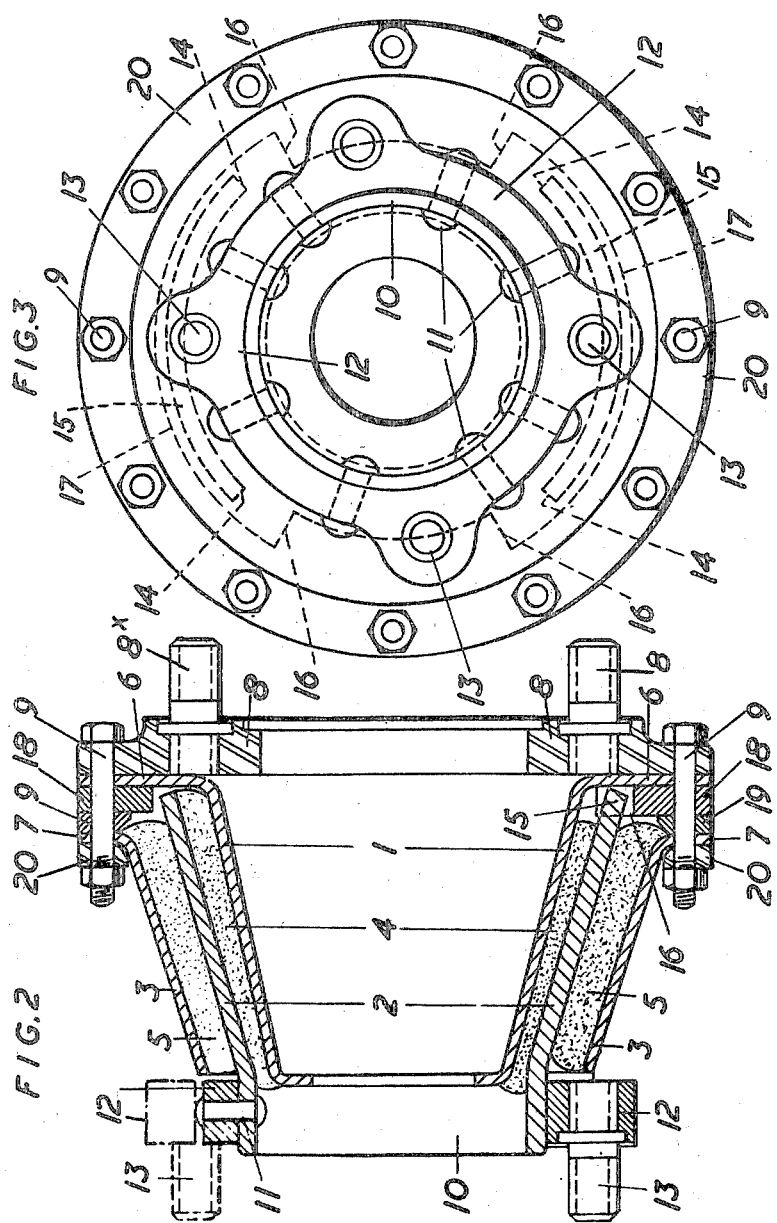

Patented Dec. 20, 1949

2,491,734

UNITED STATES PATENT OFFICE 2,491,734

RESILIENT COUPLING FOR SHAFTS

Archie John Hirst, Leicester, England, assignor to Metalastik Limited, Leicester, England, a British company Application July 15, 1948, Serial No. 38,925
In Great Britain January 3, 1946

5 Claims. (Cl. 64—11)

This invention relates in general to resilient couplings for shafts, and more especially to couplings for connecting the take-off shaft of a motor vehicle gear box to the universally jointed end of the propeller shaft.

The invention has for its object to provide an improved coupling for this purpose with a high degree of radial as well as axial stiffness and with improved provision for pre-stressing the rubber or like material for resiliently transmitting the applied torsion.

According to the invention, the coupling comprises at least three conical metal sleeves coaxially nested together in intercalated relationship with rubber or like resilient material filling the annular interspaces defined by the axially overlapped portions of the said sleeves, the arrangement being such that relative axial adjustment between the sleeves will cause substantial prestressing of the resilient material in shear as well as precompression thereof, the coupling being provided with means for effecting such adjustment acting between adjacent end parts of the inner and outer sleeves beyond the resilient material. Preferably the resilient material will be bonded by vulcanisation to the opposed faces of the conical sleeves, but in certain applications it may be secured thereto by adhesive which, in conjunction with the pressure or friction exerted by the resilient material under compression, serves to transmit the drive, whilst in some cases bonding or the use of an adhesive may be dispensed with, the pressure or friction alone being relied upon for the drive.

Where the resilient material is bonded to the conical sleeves, provision may be made for relative rotational adjustment of adjacent conical sleeves, so that the resilient material between them can be pre-loaded torsionally.

In order that the invention can be clearly understood, it will now be explained in greater detail with reference to the embodiment shown in the accompanying drawings; wherein:

Figure 2 is an axial section showing the coupling unit connected to end coupling rings for connection to the driving and driven shafts and with the resilient material pre-compressed and pre-stressed in shear.

Figure 3 is an end elevation of Figure 2, but omitting the driving connections.

Figure 1:
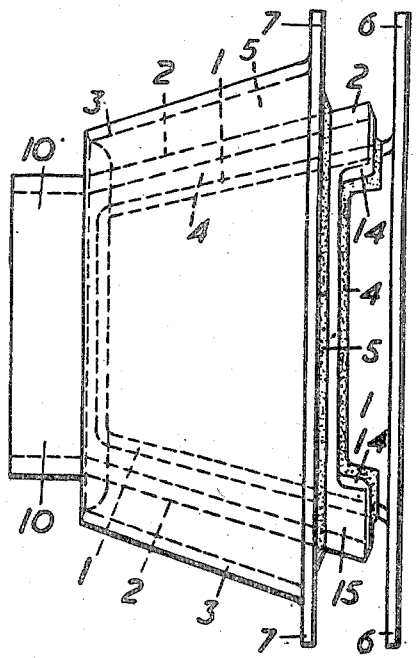
Figure 1 is a side elevation of a resilient coupling unit suitable for connecting the power take-off shaft of a motor vehicle gear box to the universally jointed end of the propeller shaft.

Referring to the drawings, and more particularly to Figure 1, the resilient coupling unit comprises three conical metal sleeves 1, 2 and 3 which are nested together co-axially in overlapped or intercalated relationship to define between their overlapped portions two annular spaces which are filled by rubber inserts 4 and 5. The rubber insert 4 which fills the annular space between the innermost conical sleeve 1 and the intermediate sleeve 2 is surface bonded interiorly to the outer conical surface of the sleeve 1 and exteriorly to the opposed inner conical surface of the intermediate conical sleeve 2, whilst the rubber insert 5 interposed between the intermediate conical sleeve 2 and the outermost conical sleeve 3 is similarly surface bonded to their opposed conical faces.

The conical sleeves 1 and 3 are formed at their larger ends with outwardly directed flanges or lugs 6, 7 respectively which are adapted to be connected together and to a rigid coupling disc or ring 8 (see Figures 2 and 3) by clamping bolts 9, said disc or ring 8 being adapted to be fixed by stud bolts 8x to a driving or take-off shaft (not shown) of any suitable known construction. In mounting the resilient unit on the coupling ring or disc 8 and tightening the clamping bolts 9 the outermost sleeve 3 is moved axially in relation to the intermediate sleeve 2 and the latter, by virtue of the rubber inserts 4 and 5, is also moved axially over the innermost sleeve 1 although not to the same extent. This relative axial adjustment causes the width of the annular spaces defined by the conical sleeves to be decreased and consequently the rubber inserts 4, 5 will be compressed and at the same time prestressed in shear. The narrow end of the intermediate conical sleeve 2 is formed integrally with a short cylindrical extension or neck-piece 10 adapted to be secured by rivets 11 to a rigid coupling ring 12 having stud bolts 13 for connection to the end of a transmission or propeller shaft (not shown) of any appropriate known construction.

The surface bonding of the rubber inserts 4, 5 to the co-axially nested conical sleeves 1, 2 and 3 may be effected with the bolt holes in the flanges or lugs 6, 7 out of register so that it is necessary partially to rotate the sleeves 1 and 3 relatively to one another in order to enable the clamping bolts 9 to be engaged with corresponding holes in the flanges or lugs 6, 7. This relative rotational adjustment of the sleeves 1 and 3 before connecting them by the clamping bolts 9 torsionally pre-loads the rubber inserts 4, 5 surface bonded to the three coaxially nested conical sleeves, the amount of such torsional preloading being determined by the angular displacement of corresponding bolt holes in the flanges 6, 7 when the rubber inserts 4, 5 are being surface bonded to the conical sleeves.

In order to provide for a positive drive in the unlikely event of the failure of the rubber inserts 4, 5 or of the surface bonding, an emergency driving connection may be incorporated in the coupling. As shown in Figures 2 and 3 of the drawing, this may comprise abutments 14, afforded at the ends of arcuate tongues 15 on the larger end of the intermediate conical sleeve 2, and abutments 16 afforded by the ends of arcuate cut-outs at 17 in a ring member 18 clamped by the bolts 9 against the coupling disc or ring 8. The arcuate tongues 15 extend into the arcuate cut-outs 17, adjacent abutments 14, 16 being normally angularly spaced sufficiently to permit the relative rotational movements of the coupling elements under ordinary operating conditions, but, in the event of failure of the rubber inserts 4, 5 or of the surface bonding, adjacent abutments 14, 16, at one or other end of the tongues 15 and at one or the other end of the cut outs 17 respectively according to the rotational direction of the drive, come into engagement automatically so as to afford a positive and solid driving connection.

As shown in Figure 3 the amount to which the rubber inserts 4, 5 are pre-compressed and loaded in axial shear by the clamping bolts 9 is determined by a spacing washer or ring 19 and the abutment ring member 18 which are mounted on the clamping bolts 9 between the flanges or lugs 6, 7. A bearing or retaining ring 20 is interposed on the clamping bolts between the nuts thereon and the flange or lugs 7 of the conical sleeve 3.

In the embodiment shown in the drawings, the confronting conical surfaces of the sleeves 1, 2 and 3 make an angle of approximately 17° with the common axis.

The pre-loading of the resilient material increases to some extent the radial stiffness of the coupling, which radial stiffness in certain application of the invention may be such as to avoid the need for a separate centering bush or other centering device, although in other cases such a device may be necessary or desirable. Also where surface bonding is employed, the construction or arrangement may be such as to ensure constant shear stress on the outer or inner bonded surfaces.

Whereas in the specific embodiment of the invention above described the larger end of the coupling is connected to the driving shaft, this is not necessarily so in every case since, in some applications of the invention, a reverse arrangement may be employed.

When the word "rubber" is employed in this specification it is intended to include suitable synthetic or artificial rubber or compounds thereof with prepared natural rubber.

I claim:

1. A resilient coupling for shafts comprising three conical metal sleeves nested together coaxially in intercalated relationship to define between their axially overlapped portions two annular spaces which are filled with rubber resilient material, a coupling ring adapted to be fixed to one shaft, the larger ends of the innermost and outermost conical sleeves having outwardly directed flanges, clamping bolts extending through said flanges and said coupling ring clamping said flanges axially together and maintaining said rubber resilient material under compression, a second coupling ring adapted to be secured to a second shaft, and the narrow end of the intermediate conical sleeve being secured to said second coupling ring.

2. A resilient coupling for shafts comprising three conical metal sleeves nested together coaxially in intercalated relationship to define between their axially overlapped portions two annular spaces which are filled with rubber resilient material, a coupling ring adapted to be fixed to one shaft, the larger ends of the innermost and outermost conical sleeves having outwardly directed flanges, clamping bolts extending through said flanges and said coupling ring clamping said flanges axially together and maintaining said rubber resilient material under compression, a second coupling ring adapted to be secured to a second shaft, and the narrow end of the intermediate conical sleeve being secured to said second coupling ring, wherein the rubber inserts between the coaxially nested conical sleeves are surface bonded thereto with the bolt holes in the flanges of the innermost and outermost sleeves out of register so that it is necessary to partially rotate said sleeves relatively to one another before inserting the clamping bolts, the said inserts thereby being pre-loaded torsionally by an amount determined by the angular displacement of corresponding bolt holes when bonding the inserts to the sleeves.

3. A resilient coupling for shafts comprising three conical metal sleeves nested together coaxially in intercalated relationship to define between their axially overlapped portions two annular spaces which are filled with rubber resilient material, a coupling ring adapted to be fixed to one shaft, the larger ends of the innermost and outermost conical sleeves having outwardly directed flanges, clamping bolts extending through said flanges and said coupling ring clamping said flanges axially together and maintaining said rubber resilient material under compression, a second coupling ring adapted to be secured to a second shaft, and the narrow end of the intermediate conical sleeve being secured to said second coupling ring, wherein the wider end of the intermediate conical sleeve and the adjacent coupling disc or ring are provided with abutments which normally are angularly spaced to permit relative rotational movements of the coupling elements under ordinary conditions and which, in the event of failure of the rubber or like inserts or of the surface bonding, automatically come into engagement to afford a positive and solid driving connection.

4. A resilient coupling for shafts comprising three conical metal sleeves nested together coaxially in intercalated relationship to define between their axially overlapped portions two annular spaces which are filled with rubber resilient material, a coupling ring adapted to be fixed to one shaft, the larger ends of the innermost and outermost conical sleeves having outwardly directed flanges, clamping bolts extending through said flanges and said coupling ring clamping said flanges axially together and maintaining said rubber resilient material under compression, a second coupling ring adapted to be secured to a second shaft, and the narrow end of the intermediate conical sleeve being secured to said second coupling ring, wherein the rubber inserts between the coaxially nested conical sleeves are surface bonded thereto with the bolt holes in the flanges of the innermost and outermost sleeves out of register so that it is necessary to partially rotate said sleeves relatively to one another before inserting the clamping bolts, the said inserts thereby being pre-loaded torsionally by an amount determined by the angular displacement of corresponding bolt holes when bonding the inserts to the sleeves, and wherein the wider end of the intermediate conical sleeve and the adjacent coupling ring are provided with abutments which normally are angularly spaced apart to permit relative rotational movements of the coupling elements under ordinary conditions, and which in the event of failure of the resilient coupling means between the sleeves will come into operation to afford a positive driving connection.

5. A resilient coupling for shafts comprising three conical metal sleeves nested together coaxially in intercalated relationship to define between their axially overlapped portions two annular spaces which are filled with rubber resilient material, a coupling ring adapted to be fixed to one shaft, the larger ends of the innermost and outermost conical sleeves having outwardly directed flanges, clamping elements clamping said flanges together to maintain the adjacent faces of said sleeves spaced a distance less than the thcikness of the resilient rubber material disposed therebetween when the latter is in its free condition to compress and stress in shear the rubber resilient material, a second coupling ring adapted to be secured to a second shaft, and the narrow end of the intermediate conical sleeve being secured to said second coupling ring.

ARCHIE JOHN HIRST.

REFERENCES CITED

The following references are of record in the file of this patent:

UNITED STATES PATENTS

| Number | Name | Date |
|---|---|---|
| 1,650,202 | Evans et al. | Nov. 22, 1927 |

FOREIGN PATENTS

| Number | Country | Date |
|---|---|---|
| 442,845 | Great Britain | 1934 |
| 688,314 | Germany | 1940 |